Aug. 3, 1937.　　　G. M. BARNES ET AL　　　2,088,581
TRANSMISSION
Filed Sept. 24, 1934　　　2 Sheets-Sheet 2
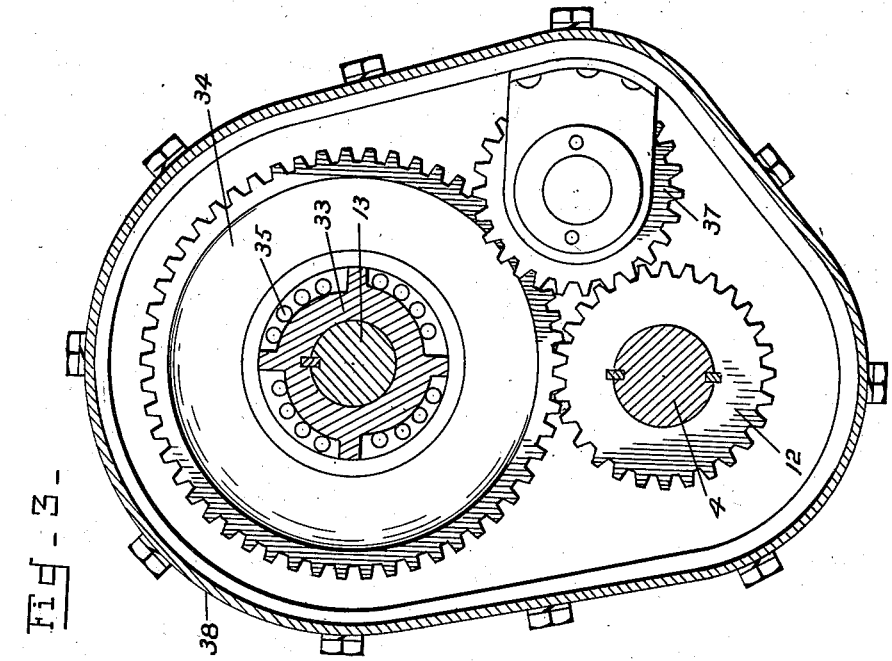
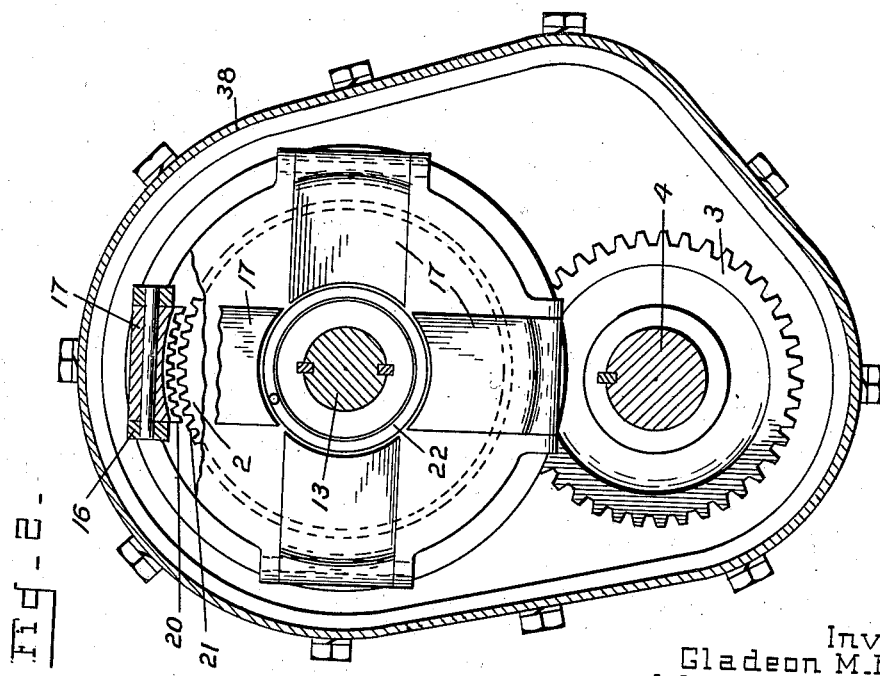
Inventors
Gladeon M. Barnes
Warren E. Preston
By W. N. Roach
Attorney Patented Aug. 3, 1937

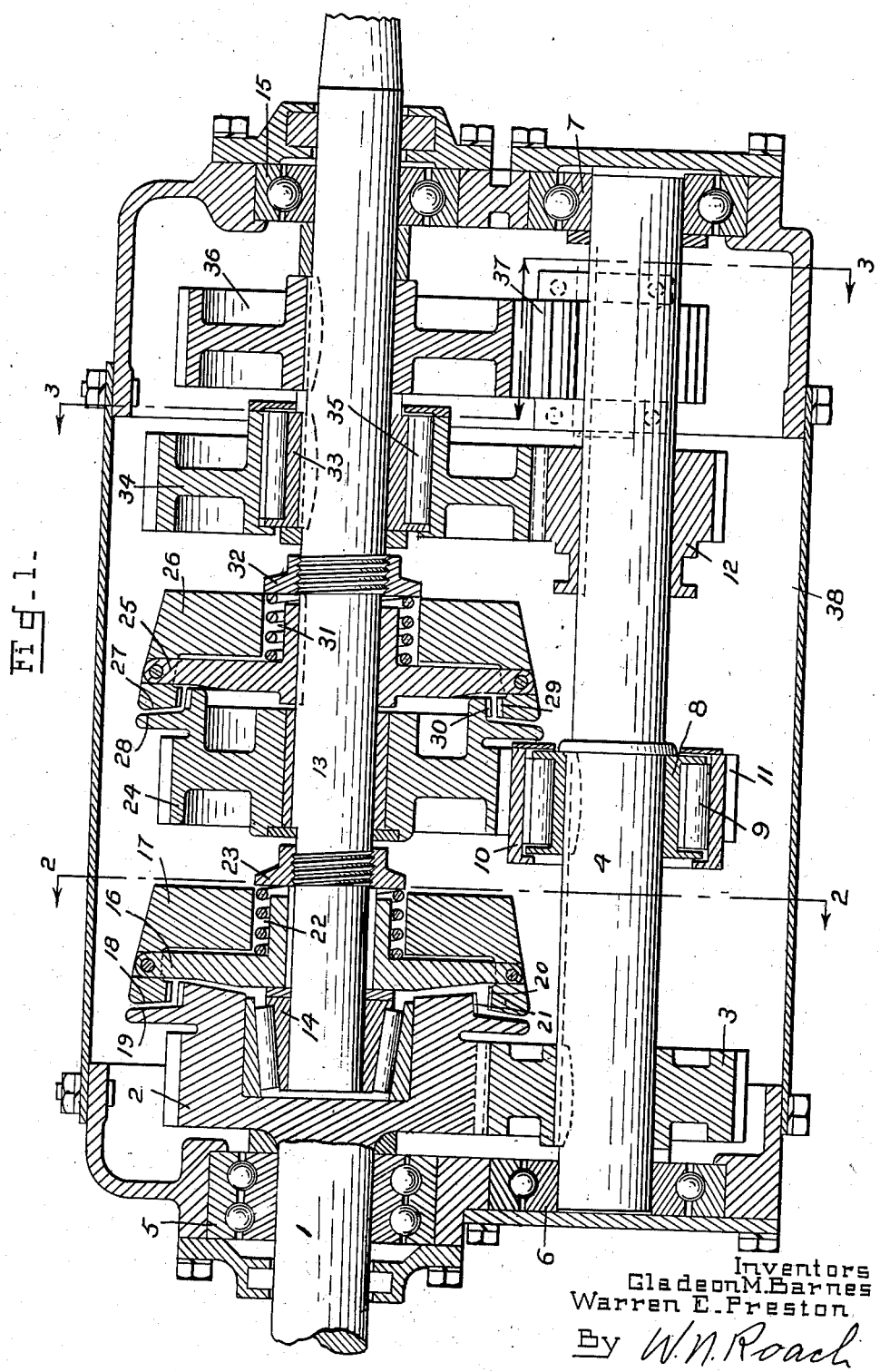

2,088,581

UNITED STATES PATENT OFFICE 2,088,581

TRANSMISSION

Gladeon M. Barnes, United States Army, Hastings, Mich., and Warren E. Preston, Aberdeen, Md.

Application September 24, 1934, Serial No. 745,308

3 Claims. (Cl. 74—336)

(Granted under the act of March 3, 1883, as amended April 30, 1928; 370 O. G. 757)

The invention described herein may be manufactured and used by or for the Government for governmental purposes, without the payment to us of any royalty thereon.

The subject of this invention is a transmission and is intended more especially for use where an automatic shift of gears is desired.

The main object of the invention is the production of a speed operated gear shift.

This object is attained by the provision of speed responsive devices brought into engagement with the gears when the shaft has attained a predetermined speed to lock the gears to the shaft. More specifically the object is attained by the use of centrifugally actuated weights adapted to engage the gears and lock them to the shaft.

With the foregoing and such other objects in view as may hereinafter more fully appear, the invention resides in the novel arrangement and combination of parts and in the details of construction described and claimed, it being understood however that changes in the precise embodiment of the invention herein disclosed may be made within the scope of what is claimed without departing from the spirit of the invention.

A practical embodiment of the invention is illustrated in the accompanying drawings, wherein:

Fig. 1 is a vertical longitudinal section through a transmission.

Fig. 2 is a transverse section on the line 2—2 of Fig. 1, part broken away.

Fig. 3 is a section on the line 3—3 of Fig. 1.

Referring to the drawings by numerals of reference:

There is provided a shaft 1 which may be connected through the usual clutch mechanism with the engine, not shown. Preferably integral with the shaft 1 is a gear 2 which meshes with a gear 3 keyed to a countershaft 4. The shaft 1 is supported in bearing 5, while the countershaft 4 is journaled in bearings 6 and 7. Also keyed to the shaft 4 and spaced from the gear 3, is an element 8 of an overrunning clutch having rollers 9 and an element 10 upon which gear teeth 11 are formed. Splined on the shaft 4 is a gear 12 which is formed to be shifted by the usual shifting lever, not shown.

In axial alignment with the shaft 1 is a shaft 13 journaled at one end in a roller bearing 14 carried in the gear 2 and, adjacent to the other end, in bearing 15.

Splined on the shaft 13, adjacent to the gear 2, is a clutch support 16 having pivotally mounted thereon centrifugally operated weights 17 formed with faces 18 adapted to engage the face 19 provided on the gear 2, and also with teeth 20 to engage teeth 21 formed on gear 2. A coiled spring 22 is interposed between the support 16 and an adjustable collar 23 threaded on the shaft 13 for the purpose of adjusting the tension of the springs and varying the pressure exerted by the faces 18 on the face 19.

Rotatable on the shaft 13 and spaced from the support 16 is a gear 24 which meshes with the gear teeth 11 on the over-running clutch element 10. Splined on the shaft 13 adjacent to the gear 24 is a support 25 having pivoted thereto the centrifugally actuated weights 26 provided with faces 27 adapted to contact the face 28 of the gear 24 and with teeth 29 adapted to engage the teeth 30 of the gear 24 when the weights are thrown by centrifugal force. A coiled spring 31 is interposed between the support and a collar 32 threaded on the shaft and adjustable to tension the spring below the tension of the spring 22 so that the gear 24 will be clutched to the shaft at a lower speed than that necessary to clutch the gear 2 to the shaft 13.

Fast on the shaft 13 is an element 33 of an overrunning clutch, another element of which is a gear 34 and interposed between these elements are the rollers 35. The gear 34 meshes with the gear 12 splined on the shaft 4 and this gearing constitutes the first or low speed. Fast on the shaft 13 adjacent to the gear 34 is a gear 36 in mesh with a usual idler 37 adapted to mesh with the gear 12 when the same is thrown to its rearward position. This train of gears constitutes the reverse drive.

The transmission may be enclosed in the usual transmission housing 38.

The operation of the device is as follows: When starting the gear 12 is in mesh with the gear 34 and the drive is through shaft 1, gear 2, gear 3, shaft 4, gear 12, gear 34 and shaft 13. When shaft 13 has attained a predetermined speed of rotation, the weights 26 will have been thrown out sufficiently to cause the faces 27 of the weights 26 to contact the face 28 of the gear 24 and cause the two to rotate in unison. Further extension of the weights will cause their teeth 29 to engage the teeth 30 of the gear 24 so as to lock the parts together. During this period the shaft 13 will be rotating faster than if the drive were through the shaft 4, gear 12 and gear 34 and as a consequence the overrunning clutch of which the gear 34 is an element will keep its parts and the parts connected thereto in position to impart no motion to the shaft 13. Should greater speed be imparted to the shaft 4 and through it to shaft 13, the weights 17 of the other clutch will be extended to such an extent that the faces 18 will contact the face 19 of the gear 2 bringing the movement of the two into unison when the teeth 20 will engage the teeth 21 of the gear 2 thus locking the shafts 1 and 13 together. The over-running clutch will again come into play to allow the gears 10 and 24 to run free.

The reverse being the usual type needs no description.

We claim:

1. In a power transmission device, a drive shaft, a driven shaft coaxial with the drive shaft, a countershaft, gearing between the drive shaft and countershaft, a first support splined on the driven shaft adjacent the gearing of the drive shaft, members on said support movable into driving engagement with the gearing of the drive shaft in response to speed of the driven shaft to provide a direct drive, a gear free on the driven shaft adjacent the first support, means on the countershaft and including an overrunning clutch for driving the free gear on the driven shaft, a second support splined on the driven shaft adjacent the free gear, members on said support movable into driving engagement with said free gear in response to speed of the driven shaft to provide an intermediate speed drive, a gear on the driven shaft adjacent the second support and including an overrunning clutch to provide a low speed drive, and means for driving said last named gear from the countershaft.

2. In a power transmission device, a drive shaft, a driven shaft coaxial with the drive shaft, a countershaft, gearing between the drive shaft and countershaft, a first support splined on the driven shaft adjacent the gearing of the drive shaft, members on said support movable into driving engagement with the gearing of the drive shaft in response to speed of the driven shaft to provide a direct drive, a gear free on the driven shaft adjacent the first support, means on the countershaft and including an overrunning clutch for driving the free gear on the driven shaft, a second support splined on the driven shaft adjacent the free gear, members on said support movable into driving engagement with said free gear in response to speed of the driven shaft to provide an intermediate speed drive, and means for driving the driven shaft at low speed from the countershaft.

3. In a power transmission device, a rotatable shaft, a gear rotatable relative to the shaft and coaxially therewith, a contact face on said gear, teeth on said gear adjacent to the contact face, a support fixed on the shaft, weights carried by the support, contact faces on the weights adapted to engage the contact faces of the gear when the weights are moved radially from the shaft, and teeth on the weights adapted to engage the teeth on the gear when the weights are further actuated.

GLADEON M. BARNES.
WARREN E. PRESTON.